United States Patent
Gershenfeld et al.

(10) Patent No.: US 9,506,485 B2
(45) Date of Patent: Nov. 29, 2016

(54) HIERARCHICAL FUNCTIONAL DIGITAL MATERIALS

(71) Applicants: Neil Adam Gershenfeld, Somerville, MA (US); Jonathan Daniel Ward, Somerville, MA (US)

(72) Inventors: Neil Adam Gershenfeld, Somerville, MA (US); Jonathan Daniel Ward, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/669,434

(22) Filed: Nov. 5, 2012

(65) Prior Publication Data

US 2013/0189028 A1 Jul. 25, 2013

Related U.S. Application Data

(60) Provisional application No. 61/555,747, filed on Nov. 4, 2011.

(51) Int. Cl.
| | |
|---|---|
| *F16B 1/00* | (2006.01) |
| *A63H 33/04* | (2006.01) |
| *F16B 3/00* | (2006.01) |
| *B29C 67/00* | (2006.01) |

(52) U.S. Cl.
CPC . *F16B 1/00* (2013.01); *F16B 3/00* (2013.01); *B29C 67/0051* (2013.01); *Y10T 403/70* (2015.01); *Y10T 403/74* (2015.01)

(58) Field of Classification Search
CPC .. A63H 33/04; A63H 33/042; A63H 33/062; A63H 33/086; F16B 1/00; F16B 3/00; B29C 67/005; B29C 67/0051; Y10T 403/70; Y10T 403/74

USPC ........ 428/33, 542.8; 446/117, 118, 119, 120, 446/121, 122, 124, 125, 108, 128; 403/345, 403/404; 273/153 R
See application file for complete search history.

(56) References Cited

U.S. PATENT DOCUMENTS

| | | | |
|---|---|---|---|
| 2,314,949 A | 3/1943 | Palmer | |
| 2,380,336 A | 7/1945 | Schwebel | |
| 3,005,282 A | 10/1961 | Christiansen | |
| 3,157,582 A * | 11/1964 | Babule et al. | ................ 376/459 |
| 3,597,875 A * | 8/1971 | Christiansen | ........ A63H 33/086 446/128 |
| 3,836,099 A | 9/1974 | O'Neill et al. | |
| 4,009,543 A | 3/1977 | Smrt | |
| 4,247,066 A | 1/1981 | Frost | |
| 4,593,514 A | 6/1986 | Smith | |

(Continued)

FOREIGN PATENT DOCUMENTS

DE 202009000527 U1 3/2009

OTHER PUBLICATIONS

LEGO Basic Blue Bucket Set 7615 Instructions, 2009.*

(Continued)

*Primary Examiner* — Joanna Pleszczynska
(74) *Attorney, Agent, or Firm* — Norma E. Henderson

(57) ABSTRACT

A hierarchical digital material comprises a set of self-similar digital voxels and connectors. Each voxel is connectable to other self-similar digital voxels by means of the connectors and each voxel is configured to accept connectors of differing sizes. Voxels and connectors may be of differing sizes. Voxels and connectors of the same or differing sizes are connectable to each other in order to assemble two- and three-dimensional structures. The voxels within a structure may be made of differing materials, as may the connectors.

18 Claims, 10 Drawing Sheets

(56) References Cited

U.S. PATENT DOCUMENTS

| | | | |
|---|---|---|---|
| 4,780,643 A | 10/1988 | Ellis | |
| 5,378,185 A * | 1/1995 | Ban | 446/124 |
| 5,398,472 A | 3/1995 | Eichelkraut | |
| 5,453,034 A * | 9/1995 | Larws | A63H 33/062 446/103 |
| 6,336,269 B1 | 1/2002 | Eldridge | |
| 6,407,738 B1 * | 6/2002 | Wakabayashi | 345/424 |
| 7,007,370 B2 | 3/2006 | Gracias | |
| 7,162,324 B2 | 1/2007 | Silverbrook | |
| 7,625,261 B2 | 12/2009 | Andersen | |
| 2002/0064909 A1 * | 5/2002 | Gracias et al. | 438/129 |
| 2003/0146346 A1 | 8/2003 | Chapman, Jr. | |
| 2006/0046604 A1 | 3/2006 | Scarborough | |
| 2008/0220112 A1 | 9/2008 | Waldrop | |
| 2009/0030501 A1 | 1/2009 | Morris | |
| 2010/0007223 A1 | 1/2010 | Denne | |
| 2010/0018420 A1 | 1/2010 | Menard | |
| 2010/0197148 A1 | 8/2010 | Rudisill | |
| 2010/0260221 A1 | 10/2010 | Yu | |
| 2011/0123794 A1 | 5/2011 | Hiller | |
| 2013/0189028 A1 | 7/2013 | Gershenfeld | |

OTHER PUBLICATIONS

International search report and written opinion of international searching authority, PCT/US2014/022168, international filing date Mar. 7, 2014, report dated Nov. 28, 2014.

Supplementary European search report, EP 11846817, international filing date Oct. 19, 2011, report dated Feb. 10, 2015.

International search report and written opinion of international searching authority, PCT/US2011/056961, international filing date Oct. 19, 2011, report dated May 21, 2012.

International search report and written opinion of international searching authority, PCT/US2013/047195, international filing date Jun. 21, 2013, report dated Nov. 1, 2013.

International search report and written opinion of international searching authority, PCT/US2013/054034, international filing date Aug. 7, 2013, report dated Apr. 15, 2014.

International search report and written opinion of international searching authority, PCT/US2013/056063, international filing date Aug. 21, 2013, report dated Apr. 28, 2014.

* cited by examiner

HIERARCHICAL FUNCTIONAL DIGITAL MATERIALS

RELATED APPLICATIONS

This application claims the benefit of U.S. Provisional Application Ser. No. 61/555,747, filed Nov. 4, 2011, the entire disclosure of which is herein incorporated by reference.

STATEMENT REGARDING FEDERALLY SPONSORED RESEARCH OR DEVELOPMENT

This invention was made with U.S. government support under Grant Number W911NF-08-1-0254, awarded by Defense Advanced Research Projects Agency (DARPA). The government has certain rights in this invention.

FIELD OF THE TECHNOLOGY

The present invention relates to digital materials and, in particular, to a hierarchical digital material that has self-similar parts of variable voxel size.

BACKGROUND

Numerical control (NC) machine tools have enhanced design and fabrication since the 1940's. The early machines were manual lathes and mills that were retrofitted with stepper motors to automate motion control to increase production speeds, accuracy, and part complexity. Modern Computer numerically controlled (CNC) machines use CAD/CAM (computer-aided design/computer-aided manufacturing) work flows which make manufacturing almost as easy as pressing "print". Desktop milling machines for making custom engraving or custom circuit boards and/or three-dimensional (3D) printers that can produce physical 3D models are now common. The digital description-file for a part can be created using many different 2D- or 3D-design software packages and subsequently shared on the Internet in order to be downloaded and reproduced wherever a rapid prototyping machine exists. This has and will continue to revolutionize the way people design and make things.

Most current rapid-prototyping machines are fundamentally continuous or analog processes. Although many fabrication machines are digitally controlled, these machines continuously cut or add material to make parts. Rapid prototyping machines can be broken into two categories: additive and subtractive fabrication machines. Additive prototyping machines typically build models by extruding a material in a in a liquid state; and then, the material hardens or is hardened after exiting the print head. For example, FDM (fused deposition modeling) extrudes a molten plastic, which cools after leaving the extruder head; and stereolithography is a process that extrudes a bead of UV curable photopolymer resin which is cured by a UV laser after it is deposited in place. Oppositely, subtractive machining processes start with a chunk of material and remove material in a controlled way to create the desired part. CNC milling machines are a common form of subtractive machining; these machines use a high-speed spindle or router to cut wood, plastic, steel, or other machineable materials. CNC milling machines have been constructed with up to the six degrees of freedom and can be built at scales that can fit on a desktop or fill industrial shops. Although both additive and subtractive rapid prototyping processes are becoming more accessible and affordable, they are still material dependent processes, and the fabrication process is not reversible. CNC milling machines continuously subtract material, and 3D printers continuously add material; although, both of these processes use digitally controlled machines, these fabrication processes are still fundamentally continuous or analog.

Digital technology has most notably revolutionized information technology and computing, but construction and fabrication are still largely continuous (analog) processes. This results in parts for products being one-off designs that cannot easily be reused; when these parts become obsolete they most likely end up in landfills. Similarly, materials made from many different types of materials are expensive and time consuming to break down for recycling. Trash is an analog concept, whereas digital materials take full advantage of reuse and recycling. Therefore, building a material from multiple materials with reversible bonds between parts would allow a multi-material product to be completely recycling and reused.

A digital material is made up of discrete parts that are the fasteners and the indexing fixture for assembly. Rather than having many complex shapes, fixtures, and jigs, which sometimes require expert assemblers and documentation, digital materials reduce the unique part count to simplify building instructions. Alexander Graham Bell, know primarily as the inventor of the telephone, also invented the space frame in order to build large kites around the year 1900. He used a tetrahedral structure that had few unique parts and tuned for stiffness. In 1907 Bell designed a 28 m tall tower using another variation of his space frame structural system. The tower weighed only 5 tons and was erected by unskilled laborers in a mere 10 days. These space frame structures had many of the same properties of a digital material; the structures were made of discrete parts with discrete joints. The space frames built by Bell had few unique parts and simplified assembly instructions.

A digital material is made up of a discrete number of parts (components) that have a finite number of connections. These digital building blocks are referred to as voxels or 3D pixels. The components can be of any size and shape, made out of various materials, and can fit together in various ways. The components of digital materials must satisfy the conditions that each component can be decomposed into a finite number of smaller geometrical shapes, that two components can only make a small finite number of different connections (links), and that the connection between any two components is reversible.

Digital parts are error correcting and self-aligning, which allows them to be assembled into structures with higher accuracy than the placement accuracy of the assembling person or machine. For example, a Lego™ set consists of discrete parts that have a finite number of joints. The male/female pin joints on the top and bottom of the Lego™ block are discrete connections, which either make or do not make a connection to another block. By contrast, a masonry construction is a continuous (analog) material; while the masonry brick is a discrete unit, the mortar in its fluid state allow one brick to be placed on top of another in an infinite number of positions. Because the joint is not discrete, masonry construction is analog while Lego™ construction is digital.

Lego™ blocks utilize a discrete pin joint has a tapered feature which allows one block to register to another and correct for placement errors below a maximum error threshold. To illustrate error correction in Lego™ blocks, a human child may have approximately 0.2 mm of hand placement accuracy, but the self-aligning feature of the Lego™ connectors correct for placement errors can allow the child to assemble structures within tolerances of approximately five microns. This is analogous to the field of digital information technology. Claude Shannon showed that near perfect communication could be achieved over a noisy channel as long as the noise was below a certain threshold which can be calculated. Similarly, a physically digital structure can self-align in order to correct for placement errors and create near perfect structures.

Structures that are created from multiple material types allow explicit control over design and optimization parameters. Digital materials can be constructed out of rigid, flexible, transparent, opaque, conductors, insulators, semiconductors, lightweight, or heavy materials. Multiple material structures could be used to build microfluidics structures or assemblies made up of active and passive electronics, optics, and/or parts with specific mechanical properties. Digital materials allow any or all of these materials can be assembled within the same assembly. A multiple material digital assembly can be built by one multi-material digital assembler machine. Multi-material 3D printers already exist, but the parts are not reversible and the material palette is limited to some rigid photopolymers and elastomers. Objet machines deposit drops of material that are cured in place. The drops of material are discrete, but they still bond to another drop in infinite possible ways. Two of the primary functional requirements for a completely digital material are discrete joints and reversible bonds between parts.

A digital material is made up of parts with reversible connections between all of the building blocks that make up the material. The materials can be assembled by a digital assembler machine; the assembler may also be a disassembler. Such a machine will have a head for disassembly and sorting. Another possibility is to use a separate machine to take on the tasks of disassembling, sorting, and delivering parts back to the assembler machine. The reversible connections allow the exact same parts to be reused and reconfigured without waste or degrading the quality of the material. For example, physically digital conductors and insulators can make reconfigurable 3D circuits. Physically digital active electronics also opens up the possibility of having discrete transistors with reversible connections to make devices such as reconfigurable ASICs or other devices that can be reprogrammed by changing the physical configuration of the parts making up a device.

Jonathan Hiller (Cornell University) has constructed a voxel assembling machine and the resulting models were shown to be reversible. This machine assembles structures made up of many spherical voxels and deposits an adhesive to bind the spheres together. The assemblies were shown to be reversible and reused by dissolving the adhesive binder and separating the parts by material type for reuse.

A press-fit interference connection may be used rather than adhesives for connecting parts. Press-fit connectors eliminate the use of adhesive binder. However, the geometry required for press fit parts adds complexity to part handling and part fabrication. Spheres are easy to manufacture and handle at many scales from many materials, and they self align when placed on a lattice. A press-fit connection is a joint that holds together by friction or micro bonding between surfaces. Press-fit connections are also referred to as interference fit, because one part is essentially interfering with the space of another. A press fit connection can be generally analyzed using the following equations:

$$f=kx \text{ (where x is the slot width)}$$

$$S=x^2 \text{ (S is contact surface area)}$$

$$k=YS \text{ (Y is the material's Young modulus)}$$

$$f=Ys^3 \text{ (f is the force required to pull apart two slot-ted press-fit parts)}$$

Force, area, friction, and surface finish as well as material and fabrication tolerances greatly affect the quality and repeatability of a press-fit connection. Force between two surfaces can greatly increase amount of surface area actually in contact.

One common press-fit part design is a slotted connection which mates with another slot to create an interference fit connection. This slot acts as a clamp that flexes when its mate part interferes with the space the other part occupies. This clamping mechanism is essentially a flexure, which can be designed and tuned to exert a specific force while also providing a snap-lock release mechanism for ease of reversibility. The flexing part can be used for an interlocking mechanisms which can give a press-fit connection more strength than the material itself In other words, when two press fit parts are put in maximum tension, the material will break before the connection separates. This type of connection uses the principal of elastic averaging, which means the connection is overconstrained by making contact at many points over a large area. Elastic averaging is a nondeterministic connection, but the load capacity and stiffness are not limited. On the other hand, a kinematic design is deterministic but the stiffness and load capacity is limited. A release mechanism added to a flexure will provide controlled reversibility. This allows one part to be disconnected from the structure without putting significant force on the rest of the assembly. The force required to disassemble should be less than the force required to assembly when a release mechanism is designed into a part.

An example of a digital material is GIK. GIK ("Great Invention Kit") is a press-fit construction kit similar to Lego™. A benefit of GIK parts is the simplicity of the slotted press fit connection design, and the simple 2.5D shapes make GIK easy to fabricate at many scales and from many different materials. George Popescu analyzed the amount of force required to connect and disconnect GIK parts. This work showed that the force to disconnect the parts was constant after approximately 10 previous connections, meaning the connection is reliably reversible. Another interesting highlight of this work showed that the amount of force required to add or remove GIK parts simultaneously grows faster than linear with respect to the number of GIK parts. Popescu created a press-fit, GIK diode ohmic junction using copper, N-doped silicon, and lead parts. This proves that active electronics can be built with digital materials.

Many part designs have been designed and explored for use in additive assembly of functional digital materials. The basic functional requirements for the parts shapes are: parts must be two-and-a-half-dimensional (2.5D) geometry; parts must be vertically assembled; finished assemblies of parts must be able to achieve near one hundred percent density; and there must be press-fit connection between parts. 2.5D parts are desired to simplify part fabrication process. Vertical assembly simplifies the automated build process. The assembly process is similar to current 3D printing machine-a print/assembly head builds structures from the top-down. One hundred percent density is desirable to fill maximum amount of space with minimal voids in a structure; however, density can then be reduced as desired. Press-fit connections between parts are used for reversibility and to avoid using an adhesive binder. These parts eliminate the need for fasteners or assembly fixture; the parts are the fasteners and fixture for assembly.

SUMMARY

Digital materials consist of a finite set of physical parts that occupy discrete space and have discrete connections. The present invention is a type of pressfit digital material that allows building hierarchical functional structures. The hierarchical feature allows interconnect between self-similar parts, used for creating recursive 3D structures with variable density and resolution. The parts are designed to be vertically assembled with 3D interconnect. The hierarchical construction kit of the present invention provides a novel way to build physically reconfigurable, multi-material, functional 3D assemblies with potential applications in (but not limited to) electrical, and mechanical design and fabrication. This significantly enlarges the available material set, allows reversible disassembly, and imposes constraints that reduce the accumulation of local positioning errors in constructing a global shape. Digital materials bring reversibility, simplicity, low cost and speed to free form fabrication in addition to a larger material set. Assembling digital material will be the future of 3-dimensional free-form fabrication of functional materials.

Part geometries were designed and fabricated at different scales from different materials, including hierarchical voxels that connect across different scales. All parts are designed to be vertically assembled with top and bottom connections. Hierarchical digital materials according to the invention are a new way for building physically reconfigurable, multi-material 3D structures. The parts include press-fit connectors in order to build reversible assemblies that take full advantage of reuse and recycling.

In one aspect, the present invention is a hierarchical digital material comprising a set of self-similar digital voxels and connectors. At least some of the voxels and connectors are of differing sizes. Each voxel is configured to accept connectors of differing sizes. Each voxel is connectable to other self-similar digital voxels and voxels of differing sizes are connectable to each other. The connectors are connectible between voxels and are configured for connecting the voxels to each other in order to assemble two- and three-dimensional structures. In a preferred embodiment, the voxels and connectors are made out of multiple differing materials.

In another aspect, the present invention is a hierarchical digital material voxel comprising a digital material component having a regular shape, wherein the component is configured to have finite set of possible connections to self-similar components of differing sizes, and wherein the component is connectable to other self-similar components in order to assemble two- or three-dimensional structures.

In yet another aspect, the invention is a hierarchical digital material construction kit, comprising a set consisting of self-similar digital voxels and associated connectors of differing sizes, each voxel being connectable to other self-similar digital voxels via the connectors, wherein each voxel is configured to accept connectors of differing sizes and voxels of differing sizes are connectable to each other, the connectors being connectible between voxels so as to connect the voxels to each other in order to assemble two- and three-dimensional structures.

In yet another aspect, the invention is a hierarchical digital material structure, comprising a multi-dimensional structure comprising a plurality of self-similar digital voxels and associated connectors of differing sizes, wherein each voxel is configured to accept connectors of differing sizes and voxels of differing sizes are connectable to each other, wherein each voxel is connected to other self-similar digital voxels via the connectors, wherein the voxels are connected into two-dimensional layers by the connectors, and wherein the voxels and voxel layers of varying sizes are connected together via connectors together to form the multi-dimensional structure.

BRIEF DESCRIPTION OF THE DRAWINGS

Other aspects, advantages and novel features of the invention will become more apparent from the following detailed description of the invention when considered in conjunction with the accompanying drawings wherein.

DETAILED DESCRIPTION

Figure 1:
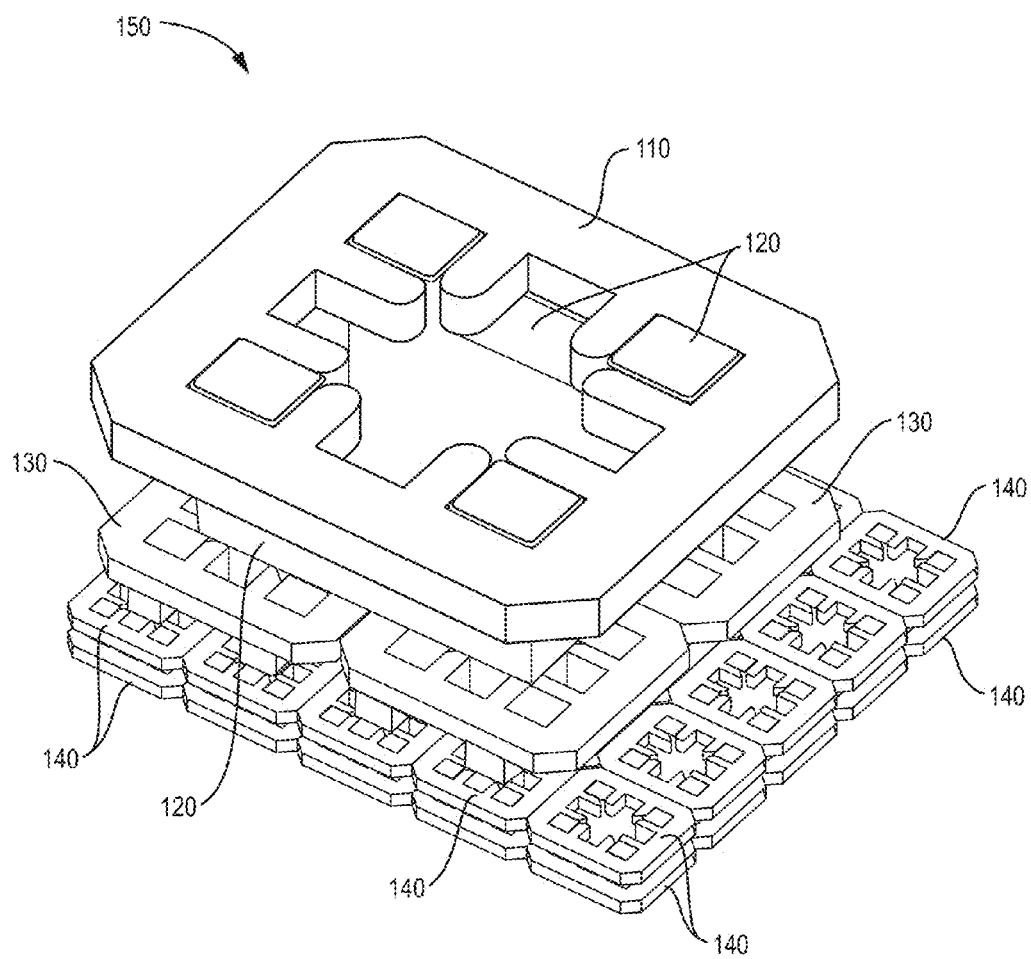
FIG. 1 is an exemplary embodiment of assembled hierarchical digital material, according to one aspect of the present invention.

In one aspect, the present invention is a hierarchical digital material. A hierarchical digital material consists of components (voxels) that can connect to self-similar components. A variable voxel size allows the blocks within an assembly to arbitrarily change feature size where needed. The difference between constant voxel size and variable voxel size is similar to the difference between a constant bit rate and variable bit rate in computing. MP3 music files, for example, use variable bit rate to reduce the size of the file without noticeable quality loss; the bit rate is higher at times in a song where this complexity is needed to express more information and lower during silences, when there is less information at times in an audio track. Similarly, a hierarchical digital material can use larger blocks for long structural spans, and smaller blocks to increase density and reduce feature size where more tightly packed blocks are needed throughout a structure.

As used herein, the following terms expressly include, but are not to be limited to:

"Digital material" means a material made out of components wherein the set of all the components used in a digital material is finite (i.e. discrete parts), the set of the all joints (connections) that the components of a digital material can form is finite (i.e. discrete joints), and the assembly process has complete control over the placement of each component (i.e. explicit placement).

"Hierarchical digital material" means a digital material that consists of components that can connect to self-similar components and have a variable size.

"Voxel" means an individual component of a digital material. A voxel has a finite number of connections to other self-similar parts. Voxels in hierarchical digital materials are of variable sizes. Voxels can take the form of shape components or connectors.

Digital assembly uses a wide range of materials and allows arbitrary sizing with interconnect between self-similar parts at different length scales. Hierarchical digital materials consist of components that can interconnect to other self-similar components. The components (voxels) can achieve this connection through horizontal or vertical assembly. A hierarchical digital material construction set can be fabricated at many scales. In other words, the voxel size within the same structure can range from arbitrarily small to arbitrarily large, limited only by the ability to fabricate voxels at a given scale. Since hierarchical digital materials allow voxel size to be variable within the same model, a structure can not only consist of multiple types of materials but also have variable feature sizes and density. This hierarchical scalability permits a wider range of applications by allowing tunable construction of assemblies with varying feature sizes and voxel density. Digital assembly of digital materials eliminates many of the constraints of traditional continuous manufacturing and rapid prototyping processes, allowing creation of multi-material, reversible, error-correcting, and reusable functional structures.

FIG. 1 depicts an exemplary embodiment of assembled hierarchical digital material voxels. In FIG. 1, components of variable sizes have been assembled to form a structure in order to demonstrate hierarchy. In FIG. 1, press-fit hierarchical parts 110, 120, 130, 140 have been used to build space frame structure 150. Voxels 110, 130, 140 are all the same shape, but have different sizes, while voxel 120 is a press-fit connector of the type used to connect shaped voxels 110, 130, 140 to each other both horizontally and vertically. As can be seen in FIG. 1, hierarchical digital material construction sets can be fabricated at almost any scale, and those parts can interconnect to the same geometric shape built at, for example, 2× or 0.5× the size of the original parts. In other words, the voxel size within the same structure can range from arbitrarily small to arbitrarily large, limited only by the ability to fabricate parts at a given scale.

Figure 2A:
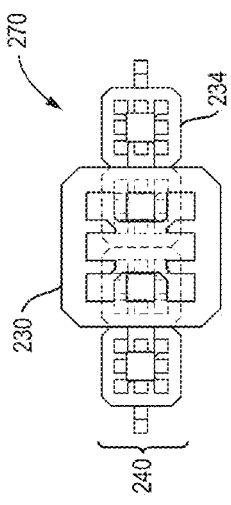
FIGS. 2A-E depict exemplary hierarchical voxels, showing scalability and vertical interconnect between self-similar parts according to one aspect of the present invention.
Figure 2C:
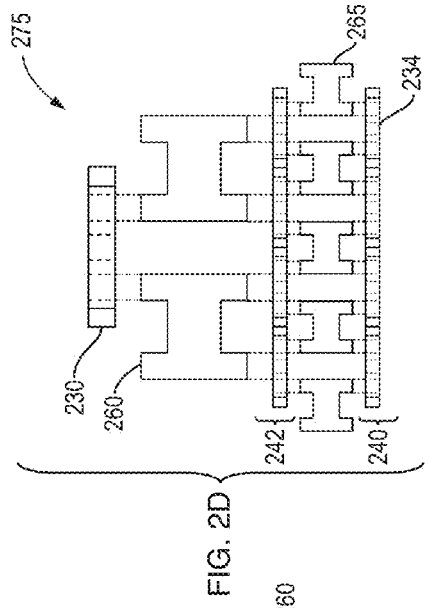
Figure 2E:
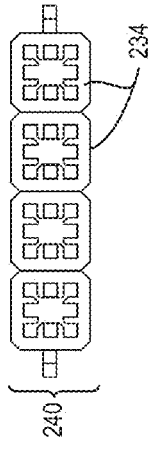
Figure 2D:
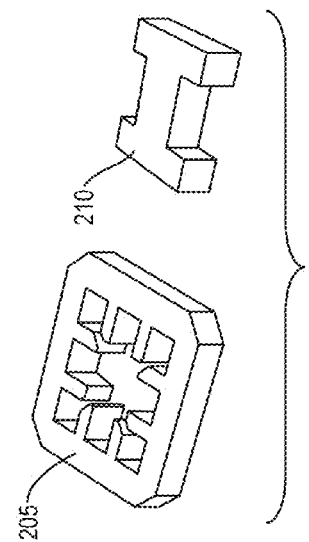
Figure 2B:
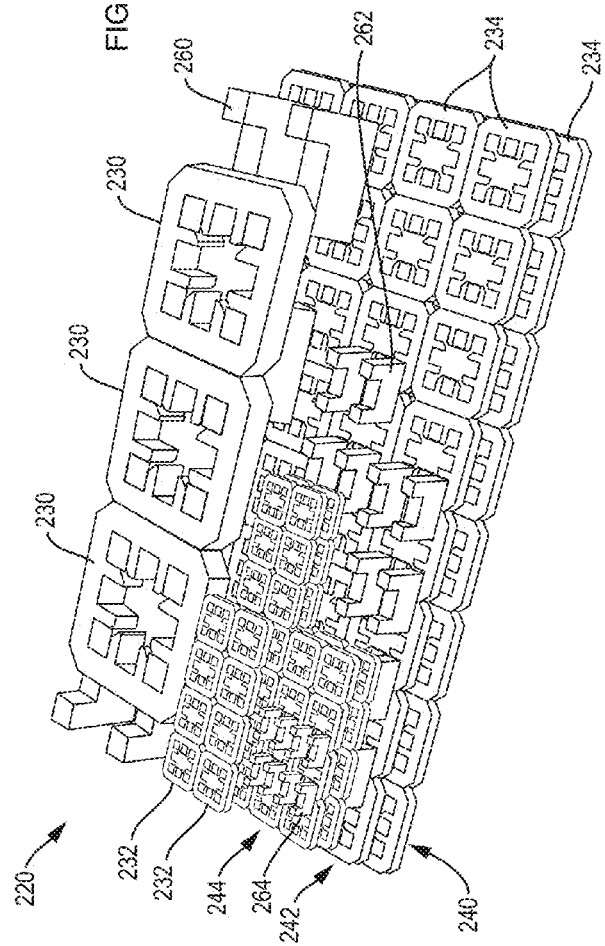

FIGS. 2A-E depict exemplary hierarchical voxels, showing scalability and vertical interconnect between self-similar parts according to an aspect of the present invention. In FIGS. 2A and 2B, voxels of shape 205 and connector 210 are used in several different sizes to assemble structure 220. Different sizes of voxels 230, 232, 234 of type 205 are interconnected with voxels of the same type 205 and size into horizontal layers 240, 242, 244 by means of connectors 260, 262, 264 of type 210. The layers are then vertically assembled by means of connectors 260, 262, 264 of type 210 in order to connect each layer to other layers of the same or different size. FIGS. 2C, 2D, and 2E, respectively, depict portions of the top 270, side 275, and bottom 280 of the structure of FIG. 2B.

Figure 3:
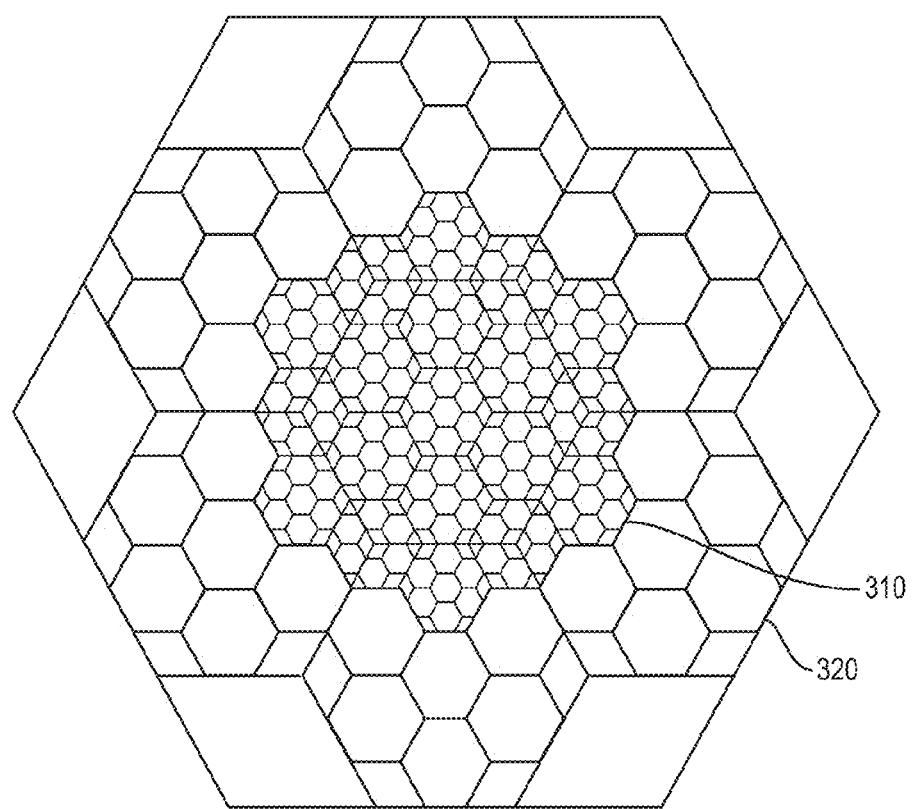
FIG. 3 depicts exemplary two-dimensional tiling of hexagonal hierarchical voxels according to an aspect of the present invention.

FIG. 3 depicts two-dimensional tiling of different sizes 310, 320 of hexagonal hierarchical voxels according to an aspect of the present invention. Hexagonal parts are designed to achieve one hundred percent density and vertically assembled 3D-interconnected structures.

Figure 4:
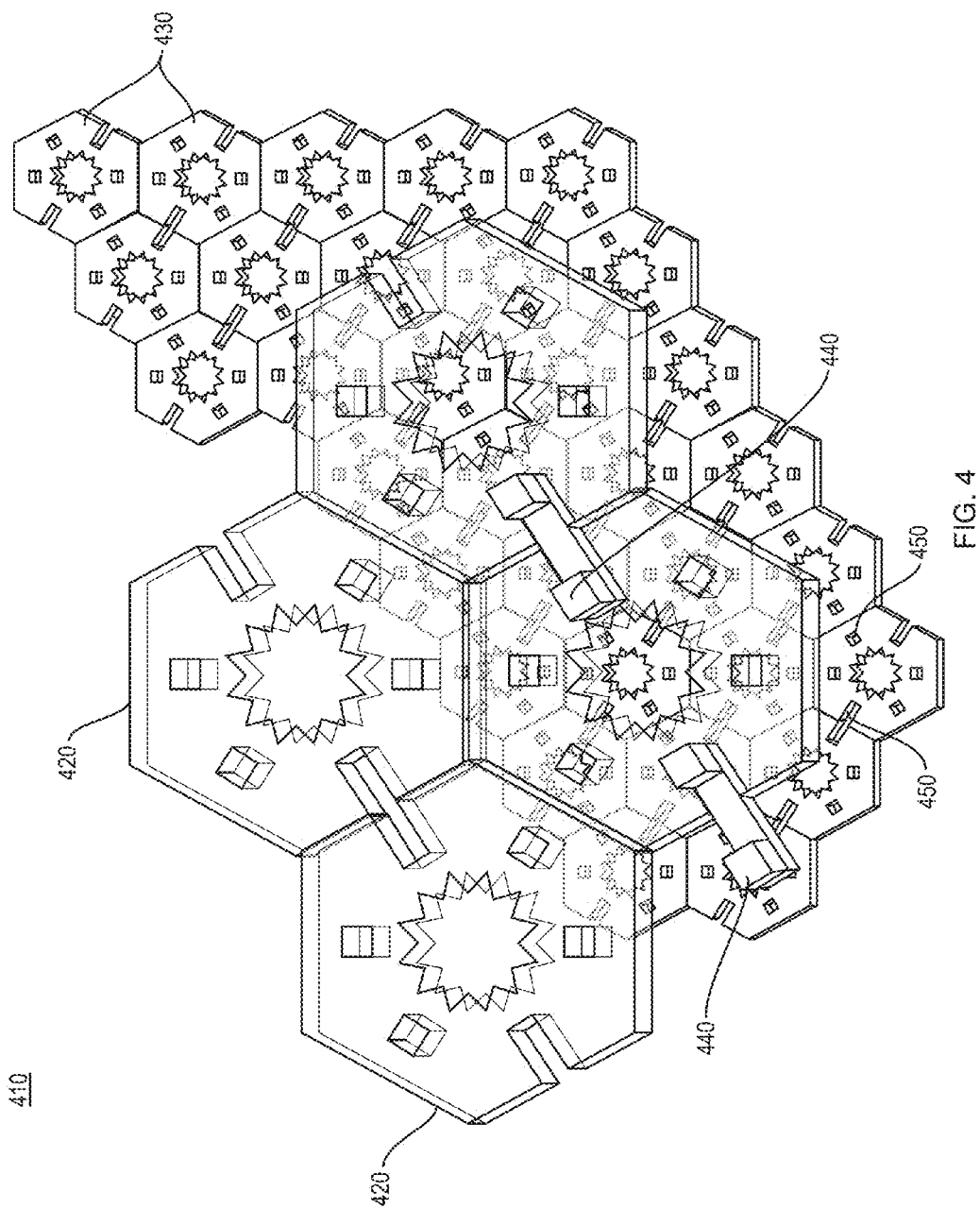
FIG. 4 is a three-dimensional model of an exemplary embodiment of a hierarchical hexagonal press-fit structure, according to one aspect of the present invention.

FIG. 4 is a three-dimensional model of an exemplary embodiment of a hierarchical hexagonal press-fit structure. In FIG. 4, hierarchical hexagonal press-fit structure 410 is comprised of two sizes 420, 430 of hexagonal voxels and two sizes 440, 450 of connectors.

Many different materials have been used to make prototype voxels according to the invention, including copper (0.0625", 0.0312", and 0.02" thickness), aluminum, acrylic, delrin, Mica-laminate, ABS plastic (0.02" and 0.03" thickness), PVC, acetate, and fish paper. It will further be clear to one of the skill in the art that many other materials will be suitable for use in the present invention. Multiple settings for speeds and feed rates were used; a basic starting point for cutting speeds and feeds has been thoroughly documented.

In general, laser cutting was not adequate for parts smaller than 0.02" (500 micron) in thickness. Laser cut parts had a significantly tapered cut edge. However, alternating the orientation of vertical face of each part in the assembly relative to how it was cut on the laser resulted in the taper to be somewhat parallel to the taper of its neighboring part which worked as an interlocking feature. Milling was the best process for making metal parts as the cuts were vertical and, when speeds and feeds were properly set, the surface finish was adequate for making a solid press-fit connection. Further prototyping will be improved by using a micro mill with ~2 micron placement accuracy and smaller (~25 micron) tool diameters to achieve smaller scale (250 micron) voxels with precision surface finish to achieve smaller parts and more reliable press-fit connections. While these fabrication methods were used for prototyping test parts, batch production of parts will likely be necessary to make digital materials feasible. Molding, extrusion, pultrusion, and stamping are potential processes to be used for batch production of digital materials.

Figure 5:
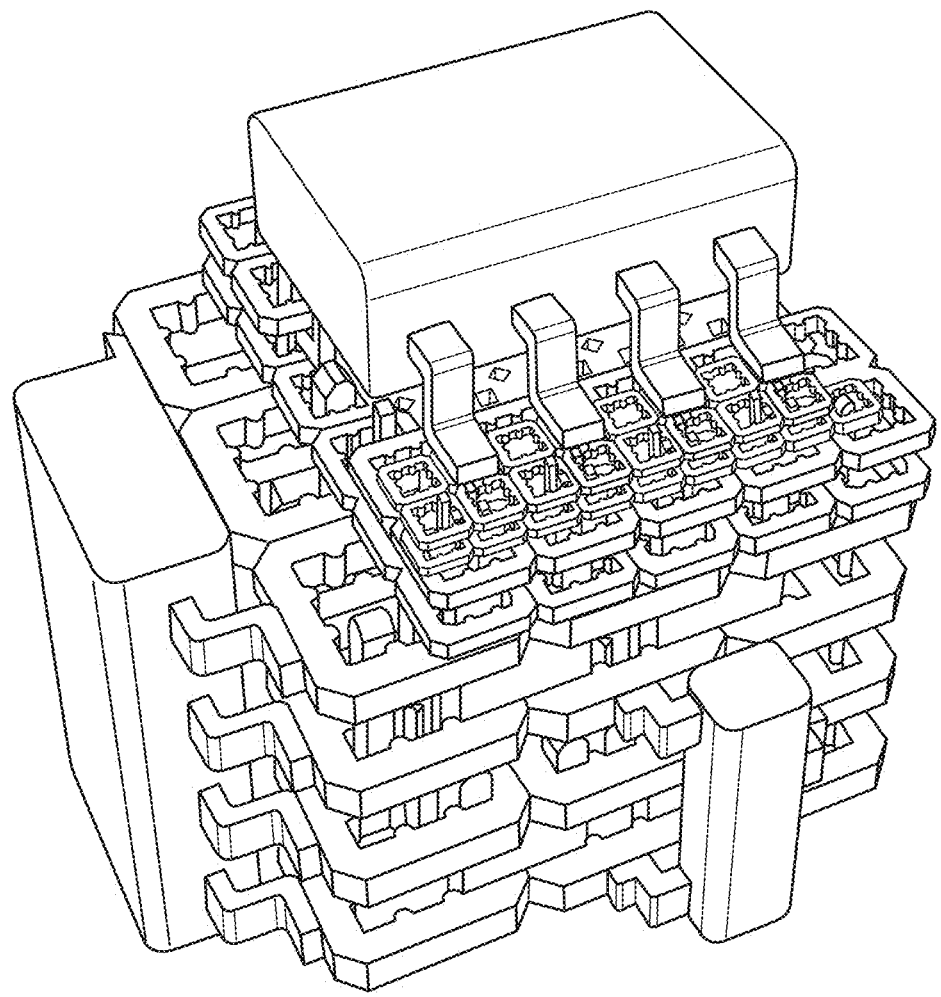
FIG. 5 is an exemplary structure made of three sizes of hierarchical press fit parts, vertically assembled to allow three-dimensional SOIC-pitch electrical components to connect to any exterior face of the structure.

It has been demonstrated that hierarchical digital materials according to the invention can be used to create functional structures. For example, conductor and insulator parts have been designed for press fit SOIC-pitch circuit boards with 3D interconnect. These parts can be hierarchical to change size within a structure or tune traces or for current levels. FIG. 5 shows a structure made of three sizes of press fit parts, vertically assembled to allow SOIC-pitch electrical components to connect to any exterior face of the structure.

Figure 6:
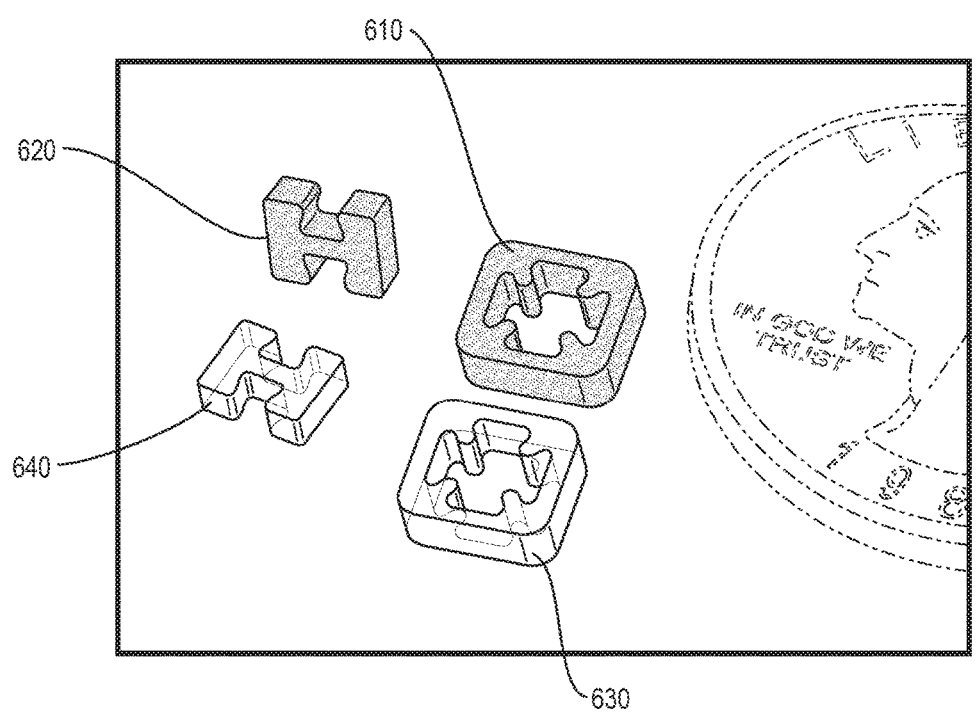
FIG. 6 depicts exemplary self-similar copper and acrylic hierarchical digital material parts according to the invention.

In order to create some functional structures, self-similar voxels made of different materials may be used and interconnected. FIG. 6 is a photograph depicting exemplary self-similar hierarchical digital material parts according to the invention that have been made from two different materials, copper 610, 620 and acrylic 630, 640.

Figure 7:
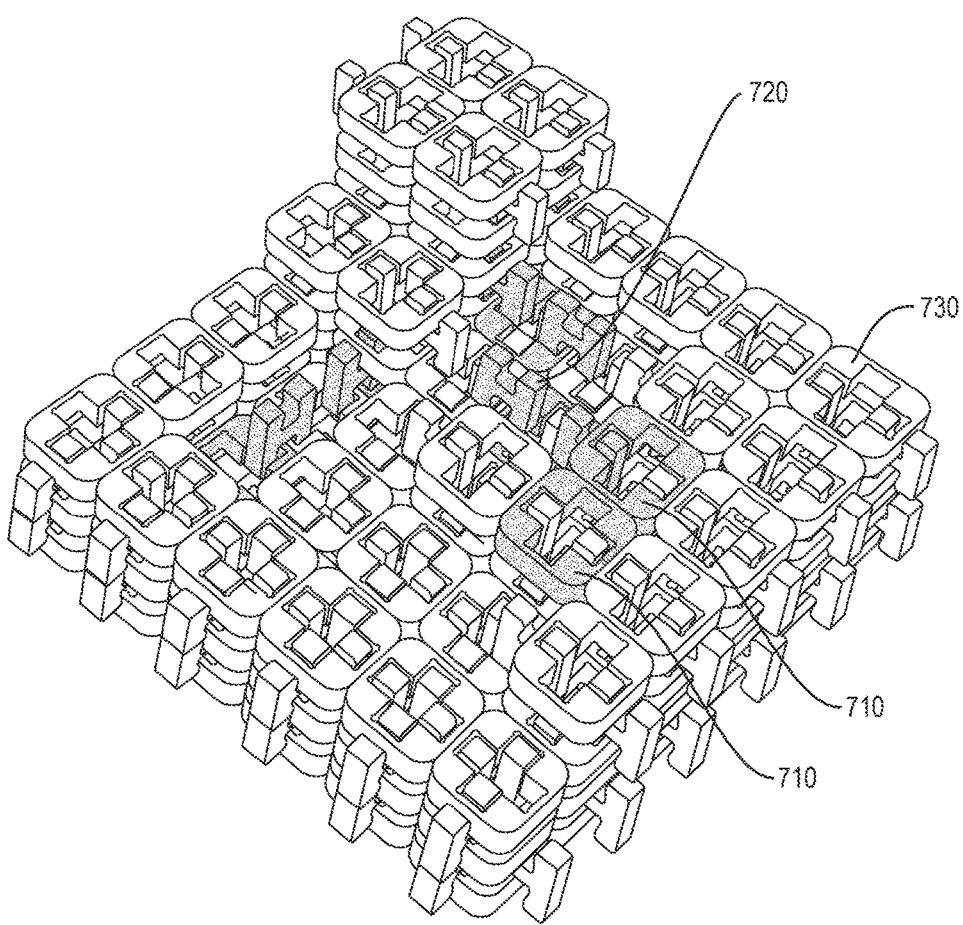
FIG. 7 is an example of a structure created using self-similar voxels of different materials.

FIG. 7 is a photograph of an example of a structure created using self-similar voxels of different materials. FIG. 7 is a digital assembly of copper conductor 710, 720 and acrylic insulator 730 parts, forming an exemplary press-fit 3D circuit (LED, resistor, and header).

Insulation-displacement connectors use a "V" shaped press fit connection which strip insulation barrier wires as they are inserted into the connector, and the connector remove oxidation at boundary layer between the copper contacts on the wire and connector. When these connectors are made properly they form a gas tight, interference connection that is highly reliable. The concept for these press-fit circuits uses the same idea: when the connection is properly designed and constructed, it will allow air tight bonding to occur to make a solderless electrical connection. A CT scan of this structure revealed that some of the acrylic parts melted during the soldering process, so a heat resistant insulator material was used for a second prototype. One prototype employed mica/paper laminate and copper parts. The mica laminate is stable up to 932 degrees F., so these parts will withstand the soldering process without deforming.

Hierarchical functional digital materials allow tuning of groups of or individual voxels to explicitly control the mechanical characteristics of a material. Combining rigid and flexible voxels in 3D halftone patterns can be used to create an auxetic material, meaning the material has a negative Poisson ratio. These materials essentially become wider when they are put in tension as opposed to a rubbery material which becomes thinner when stretched. For this reason, auxetic materials are sometimes referred to as "anti-rubber." A rubber material put in tension also maintains its volume, while a material with a negative Poisson ratio changes volume when loads are applied. Auxetics are typically useful for creating impact resistant structures. Air filters can utilize auxetic structures as the filter opens up under certain loading conditions. Hierarchical digital materials could allow ease of manufacturing and more control over the design process to create auxetic behavior at different length scales in a structure.

The hierarchical digital materials of the present invention have many applications. Part assemblies consisting of flexible and rigid materials may be used to create functional springs or flexure bearings. Optical devices may be created with variable opacity or reflection angle to change light quality or explicitly control light direction. Digital materials for optics may be used to manipulate refraction angles build lenses or devices with other unique properties such as a negative refractive index, which have been constructed from metamaterials. Digital materials may also be useful for 3D microfluidic structures that require intricate networks of capillaries. Many of these functions can be built into the same model using by the same machine using a multi-material digital assembler. Physically reconfigurable active electronics may be developed by creating press-fit active semiconductor parts. Using hierarchical functional digital materials, many different functions can be built into one assembly.

An embodiment of an automated assembler for the hierarchical functional digital materials of the invention has been developed. Digital materials built of voxels below a length scale below −2 mm length scale are difficult and time-consuming to assemble by hand, but a 3D printer/assembler can automate the build process. Digital assembly of digital materials is a novel rapid prototyping process. The prototype embodiment is a top down assembler that builds structures that are more precise than the placement accuracy of the machine itself. The machine uses error detection and error correction to build near perfect structures using a closed loop assembly process. The machine works by building vertically assembled structures by pressing parts into place. If a part is misplaced or an error occurs outside of the correction range of the material, the part is discarded and a new part is resent to ensure an accurate build process. This is similar to TCP and CRC protocols used on the Internet; the receiver can check if there is an error during a transmission and request a resend. This digital assembler can dispense any range of material types and sizes utilizing hierarchical functional digital materials to increase build speed and scale feature sizes.

An instruction set to assemble a digital material can be reduced to a simplified string of symbols. Digitally coded assembly instruction are translated to machine movement to place a voxel. Then, the code will instruct the machine to either place or not placed another voxel of a specified size and material at a location relative to the previous part and continue this process to build a digital material. The assembler machine would only need to make discrete movements which are synchronized to place parts or the correct type in the correct order. The digital assembler machine builds parts as a top-down assembly process similar to current 3D printers, and the assembler will create models layer by layer.

The assembler is a voxel-placing apparatus that can add or subtract voxels at high speeds. Similar to a pick-and-place, one building head can dispense and place different types and sizes of parts. Current pick-and-place and chip shooter technology can place parts at speeds up to 15 Hz. For example, fir a voxel size of 0.025 inches, one cubic inch would consist of $40^3$ or 64,000 voxels. If the machine were to assemble parts at 15 per second, it would take about 70 minutes to build one cubic inch of material made up of 25 mil voxels. This is comparable to build times of current 3D printing technology, but increasing speed of the assembler could be obtained by using higher feedstock flow rates, by adding more print heads for parallel assembling, and by utilizing hierarchical parts to reduce resolution in areas where small feature size is not needed.

Figure 8:
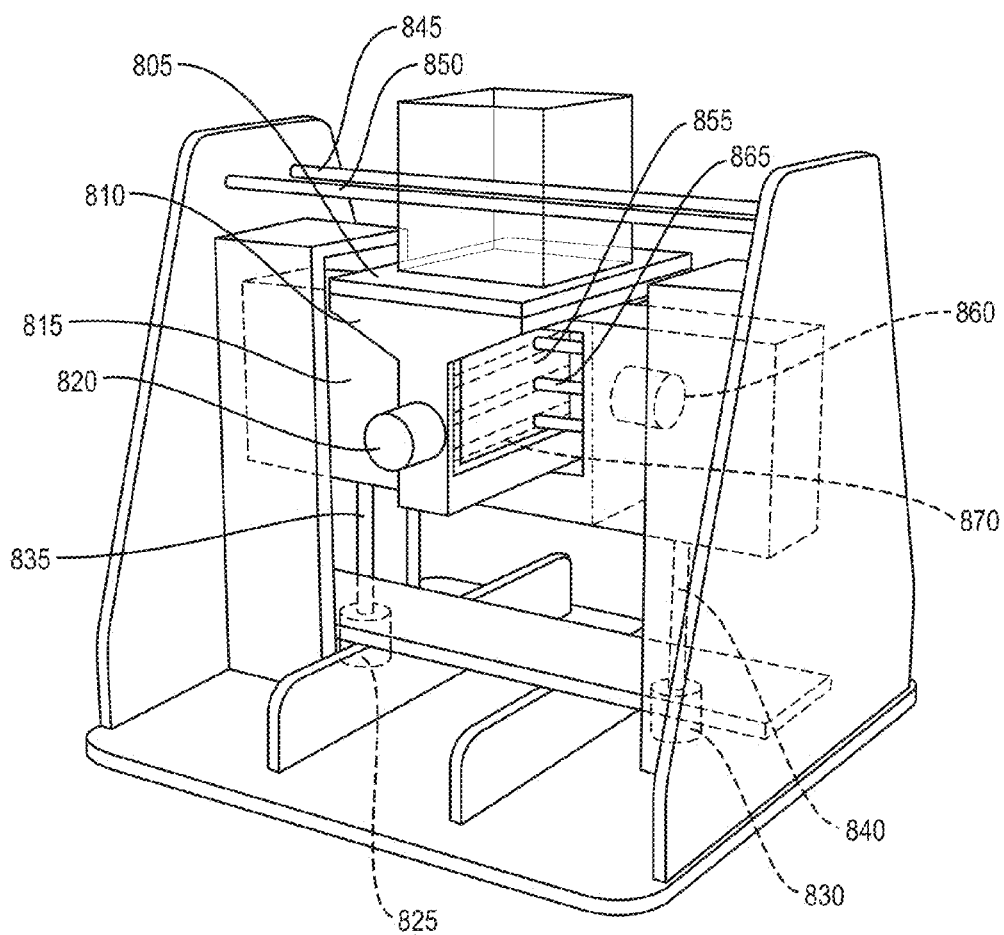
FIG. 8 is an exemplary embodiment of a 3-axis CNC machine bed useable in a machine for assembling hierarchical digital materials according to one aspect of the invention.
Figure 9:
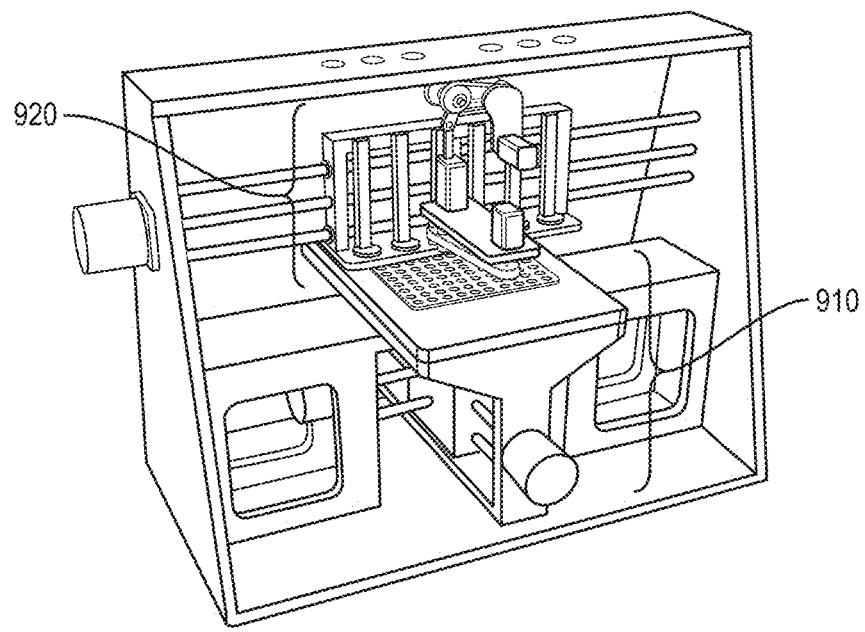
FIG. 9 is a prototype embodiment of a digital assembler rapid prototyping machine for assembling hierarchical digital materials according to one aspect of the invention.
Figure 10:
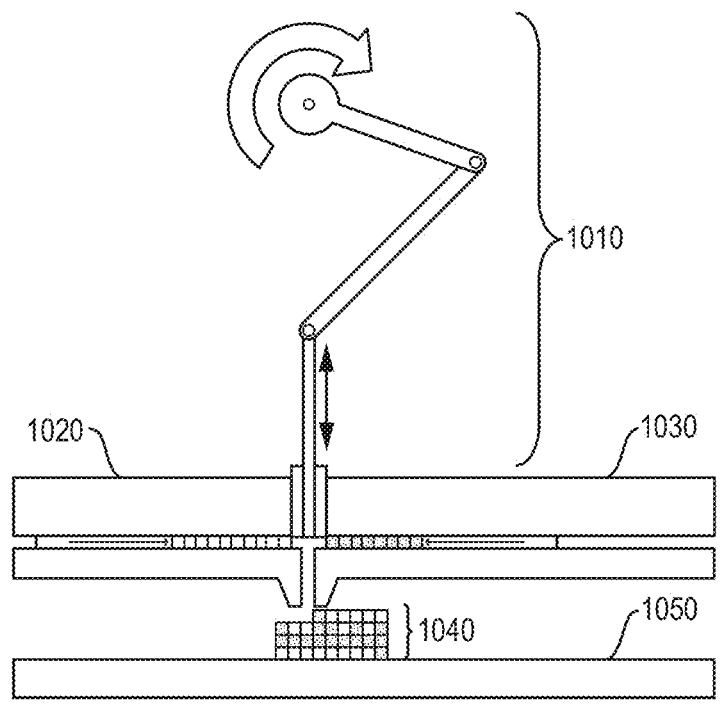
FIG. 10 is a concept rendering of an embodiment of a slider crank part-pushing mechanism for feeding parts into a voxel assembler head useable in a machine for assembling hierarchical digital materials according to one aspect of the invention.
Figure 11:
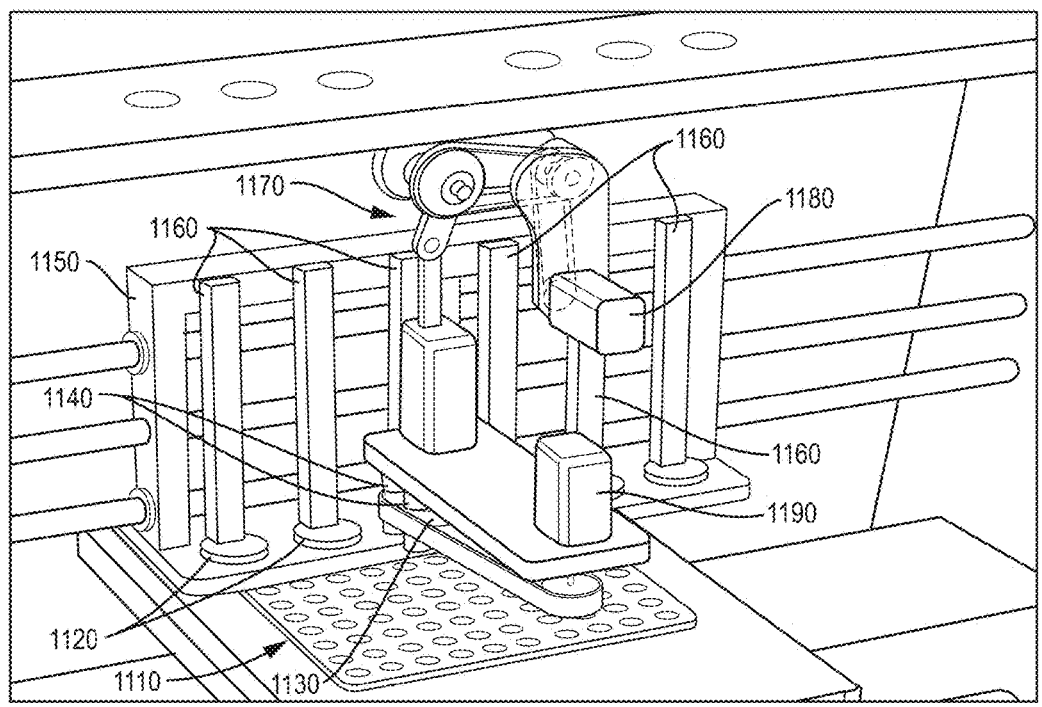
FIG. 11 is an exemplary embodiment of a voxel assembling head with multiple part feeders and assembler mechanisms useable in a machine for assembling hierarchical digital materials according to one aspect of the invention.

The prototype assembler design consists of a basic three-axis machine bed with an assembling head with part feeders that can supply a palette of different parts to the assembler. The first prototype head was built to test a simple part placing mechanism. The target goal for this machine was to assemble and disassemble conductors and insulators into working SOIC-pitch circuits with 3D electrical interconnect. This preliminary design consists of a basic three-axis machine bed and an assembling head with continuous feeders supplying conductor and insulator parts in order to build 3D PCBs. FIG. 8 depicts the machine bed, while FIGS. 9-11 depict the assembler and details of the part assembling mechanism.

FIG. 8 depicts an embodiment of a 3-axis CNC machine bed useable in an assembler for assembling hierarchical digital materials according to the invention. Shown in FIG. 8 are machine bed 805, Y-axis carriage 810, Z-axis carriage 815, Y-axis motor 820, Z-axis motors 825, 830, Z-axis leadscrews 835, 840, mounting rails 845, 850 for the assembler head, X-axis carriage 855, X-axis motor 860, X-axis leadscrew 865, and Y-axis leadscrew 870. The machine bed of FIG. 8 was developed to eliminate the need for a moving assembler head.

This platform was constructed using open loop control with stepper motors and lead screws for linear actuation. The first prototype was built with only X and Y moving bed to test and debug 2D assembly before moving to 3D assembling. The image above shows the machine before printer head and part feeders were constructed. This machine used ½"-8 dual start acme lead screws directly connected to unipolar NEMA 23 stepper motors. The motors step 200 full steps per revolution, so coupled to screws with a pitch of ¼" gives a resolution of 0.25/200 inches (0.00125") per full step. Initial testing would be done with ⅛" voxels, so a placement of ±0.001 inch would be high enough resolution for voxels at this size. Microstepping would not be needed. Simple stepper motor drivers were built using two 8 bit AVR microcontrollers. Each board has two buttons to jog the machine manually or accept step and direction input from another processor. The basic strategy is to start simple and design and build in complexity as needed.

This machine has multiple part feeders and a part pusher turret for automated assembly of multiple material types, scales, and shapes. FIG. 9 is a prototype embodiment of a digital assembler rapid prototyping machine for assembling hierarchical digital materials according to the invention. Shown in FIG. 9 are moving machine bed 910 and assembling head with part feeders 920.

The basic concept for the machine print head is a voxel-placing mechanism able to press fit parts together. FIG. 10 depicts an initial concept rendering of a slider crank part-pushing mechanism 1010 with lines of two different parts A 1020 and B 1030 being fed into each side of the head. The structure 1040 being assembled from parts A 1020 and B 1030 rests on machine bed 1050. A preferred embodiment will have 3D machine bed movement and multiple part type dispensers, as well as a reversible head for removing and sorting parts for reuse. The target speed for automated assembling will be ~1-10 Hz. Initial voxel sizes used with the prototype were designed at 0.025" thickness for compatibility with SOIC-pitch electronic components.

FIG. 11 is an exemplary embodiment of a voxel assembler head with multiple part feeders and assembler mechanisms useable in a machine for assembling hierarchical digital materials. Shown in FIG. 11 are moving machine bed 1110 on which parts are assembled here, depositing heads (1-6) 1120, part pusher turret 1130, part pushers (1-6) 1140, part feeder carriage 1150, part feeders (1-6) 1160, slider crank (part pusher mechanism) 1170, stepper motor (crank-drive) 1180, and stepper motor (part-pusher turret drive) 1190. The schematic diagram shows that the machines uses one part pushing mechanism. A turret tool changer is rotated into position below the part pushing mechanism as the corresponding part feeder is moving into place. This eliminates the complexity of moving the assembling head.

A prototype print head was built without automated actuators and a continuous part feeder for testing and visualization. The test head was constructed with a hexagonally shaped part pushing mechanism and a part loading mechanism. The concept for this mechanism is best described as being somewhere between a stapler, sewing machine, semi automatic firearm, and a 3D printer. The machine loads parts from a clip and presses them into place using a rotary to linear mechanism, such as a slider crank or cam. The part is then pushed into place while the moving machine bed locates the assembly within range of the part self aligning into the 3D lattice. Parts were loaded one by one and the part loading and placing mechanisms were actuated by hand to assemble some hexagonal parts on top of an existing single layer of parts assembled by a human with tweezers.

Many mechanical parts such as bearings or shafts may not be possible to construct from digital materials as moving parts require very accurate surface finish or geometry where a finite voxel size may not be adequate to produce these features. A continuous manufacturing process may need to be used to develop these special parts. However, a continuous part could be designed to connect to a digital structure. An example of this could be a linear plain bearing embedded in a digital assembly. Digital construction may not provide the adequate surface finish and hardness for the inside surface of a bearing, but a conventional bearing could have connectors for mating with a digital material to combine analog and digital fabrication.

Another challenge is to make press-fit structures from flexible materials. For example, a slotted press-fit connection is difficult or impossible with soft, rubber-like materials. New geometries and connection types will need to be developed for flexible materials. Post heating or adhesives can also be used to bind flexible parts together, although this will possibly result in an irreversible assembly.

Wear and tear will result from repeated interference connections between parts. This would either result in discarding or recycling parts after degradation. Another option is to develop a treatment processes and/or new materials which are more resistant to wear. For example, a coating could be applied to a surface contact region of a voxel, and this coating could be reapplied after some number of connections to restore the bond strength.

Electronic components may be placed inside voids within a structure and press fit parts may be built around the components to act as the mechanical structure and protective case for the device. Physically reconfigurable active electronics may be created by doping materials to create press-fit active electronic components, Physically reconfigurable 3D computers and electronic devices have been thought of as a strategy to decentralize hardware making debugging, upgradeability, and reuse options for electronic devices.

Support material to build hollow structures could be difficult with parts that have one hundred percent density, as there might be no hole for support material to be removed after the build process. A support material should consist of parts that do not form bonds but allow enough support and have enough compressive strength for a vertical construction process. As with current 3D printing, a hole could be left to allow support material to be removed. A second solution is to remove the support material before the model is finalized, or the model could be built in sections and the support material removed before the sections are joined.

Contact resistance can be a problem when building a digital material using conductors for an electrical or thermal conduction. In order to decrease contact resistance, the parts could be built with interference fit to reduce the gap size between contacts. A tight bond would also work to remove oxidation as the parts are joined. A conductive grease could also be applied to each joint to augment conduction or a sealant applied post assembly to prevent oxidation. However, adding grease could limit conductivity and also require part cleaning and treatment before each use.

Another compelling application for digital materials is a partially self-replicating machine which is constructed with digital materials and can assemble many of its own electrical and mechanical parts. The machine will be physically reconfigurable in size, shape, and function. Preloading between each press-fit joint would allow the possibility of building ridged and light space-frame structures to achieve stiffness and reduce vibration. The number of unique parts can thus be minimized by using digital materials, and the resulting machine will be physically reconfigurable.

Hierarchical digital materials according to the present invention permit explicit optimization of functional structures. Each part shape and material type can be tuned for the optimal shape, strength, density, and stiffness needed. Error reducing and correcting features of digital materials allow for repeatably constructing perfect structures. Similar to the shift from analog to digital technology in telecommunications and computing, the design and assembly of physical structures will be revolutionized by shifting from analog fabrication to digitally assembled digital materials. Physically reconfigurable and reusable products barely, if at all, exist in the current paradigm of manufacturing. Hierarchical digital materials according top the invention provide a novel reconfigurable construction kit with potential immediate applications in functional rapid prototyping of 3D parts. Hierarchical digital materials allow physically reconfigurable and reusable materials as opposed to one-off custom parts which typically are recycled or discarded into a landfill.

While a preferred embodiment is disclosed, many other implementations will occur to one of ordinary skill in the art and are all within the scope of the invention. Furthermore, each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. A hierarchical digital material, comprising:
    at least one set of digital voxels, wherein all of the voxels in any individual set of voxels have an exactly identical shape, and wherein at least some of the voxels in the individual set are of differing sizes but have a proportionally exactly identical shape to all voxels in the individual set that are of a different size; and
    at least one set of connectors, wherein the connectors are each physically separate components from the voxels, wherein all of the connectors in any individual set of connectors have an exactly identical shape, the connectors being physically connectible between all of the voxels in the same set of voxels and configured for physically connecting the voxels in the set to each other in order to assemble two- and three-dimensional physical structures, wherein at least some of the connectors in any individual set are of differing sizes but have a proportionally exactly identical shape to all connectors in the individual set that are of a different size, and wherein each voxel is configured to accept proportionally exactly identical connectors of differing sizes, each voxel is physically connectable to the other voxels in the same set of digital voxels by at least one connector, and voxels of differing sizes are physically connectable to each other by at least one connector.

2. The hierarchical digital material of claim 1, wherein the voxels are hexagonal.

3. The hierarchical digital material of claim 1, wherein at least some of the voxels are made of differing materials.

4. The hierarchical digital material of claim 3, wherein at least some of the connectors are made of differing materials, the materials being the same materials from which the voxels are made.

5. The hierarchical digital material of claim 1, wherein the connectors are press-fit connectors.

6. A hierarchical digital material voxel, comprising:
    a digital material component having a regular shape, wherein the component is configured to have finite set of possible connections to a set of proportionally exactly identical components of differing sizes, wherein all the proportionally exactly identical components have a shape that is proportionally exactly identical to the shape of the digital material component, and wherein the digital material component is physically connectable to the components from the set in order to assemble two-or three-dimensional physical structures, wherein the voxel is connectable to other components via a connector that is a physically separate component from the voxel and the other components and the voxel is configured to accept connectors of differing sizes.

7. The hierarchical digital voxel of claim 6, wherein the voxel is hexagonal.

8. A hierarchical digital material construction kit, comprising:
    a set consisting of digital voxels of differing sizes but having a proportionally exactly identical shape and associated connectors of differing sizes but having a proportionally exactly identical shape, wherein the connectors are each physically separate components from the voxels, each proportionally exactly identical voxel being physically connectable to all of the other proportionally exactly identical digital voxels in the set via the proportionally exactly identical connectors, wherein each voxel is configured to accept connectors of differing sizes and voxels of differing sizes are connectable to each other via connectors, and wherein the connectors are connectible between voxels in the set so as to connect the voxels to each other in order to assemble two- and three-dimensional physical structures.

9. The hierarchical digital material construction kit of claim 8, wherein the voxels are hexagonal.

10. The hierarchical digital material construction kit of claim 8, wherein at least some of the voxels are made of differing materials.

11. The hierarchical digital material construction kit of claim 10, wherein at least some of the connectors are made of the same materials as the differing materials from which the voxels are made.

12. The hierarchical digital material construction kit of claim 8, wherein the connectors are press-fit connectors.

13. A hierarchical digital material structure, comprising:
    a multi-dimensional physical structure comprising a plurality of digital voxels of differing sizes but proportionally exactly identical shape and associated connectors of differing sizes but proportionally exactly identical shape, wherein the connectors are each physically separate components from the voxels, wherein each proportionally exactly identical voxel is configured to accept proportionally exactly identical connectors of differing sizes and proportionally exactly identical voxels of differing sizes are physically connectable to each other via the proportionally exactly identical connectors, wherein each voxel is connected to other digital voxels via the connectors, wherein the voxels are connected into two-dimensional voxel layers by the connectors, and wherein the voxels and voxel layers of varying sizes are connected together via the connectors to form the multi-dimensional structure.

14. The hierarchical digital material structure of claim 13, wherein the voxels are hexagonal.

15. The hierarchical digital material structure of claim 13, wherein at least some of the voxels are made of differing materials.

16. The hierarchical digital material structure of claim 15, wherein at least some of the connectors are made of the same materials as the differing materials from which the voxels are made.

17. The hierarchical digital material structure of claim 13, wherein the connectors are press-fit connectors.

18. The hierarchical digital material structure of claim 16, wherein at least some of the voxels and connectors are made from an insulating material and some of the voxels and connectors are made from a conducting material.

* * * * *